United States Patent [19]

Willke et al.

[11] E Re. 29,539

[45] Reissued Feb. 14, 1978

[54] LEG SUPPORTED OFFSHORE STRUCTURE WITH JACKING APPARATUS

[75] Inventors: Herbert L. Willke, Houston, Tex.; James G. Abraham, Palos Verdes Peninsula, Calif.

[73] Assignee: Armco Steel Corporation, Middletown, Ohio

[21] Appl. No.: 747,802

[22] Filed: Dec. 6, 1976

Related U.S. Patent Documents

Reissue of:

[64] Patent No.: 3,606,251
Issued: Sept. 20, 1971
Appl. No.: 876,781
Filed: Nov. 14, 1969

[51] Int. Cl.[2] ..... B66F 7/12

[52] U.S. Cl. ..... 254/89 R; 254/95

[58] Field of Search ..... 254/95–97, 254/89 R; 61/46.5; 74/422

[56] References Cited

U.S. PATENT DOCUMENTS

| | | | |
|---|---|---|---|
| 1,495,176 | 5/1924 | Hill | 254/97 |
| 2,308,743 | 1/1943 | Bulkley et al. | 61/46.5 |
| 2,919,682 | 1/1960 | Sung | 74/422 X |
| 2,924,077 | 2/1960 | Le Tourneau | 61/46.5 |
| 3,044,269 | 7/1962 | Le Tourneau | 61/46.5 |
| 3,398,541 | 8/1968 | Thomas | 61/46.5 |

FOREIGN PATENT DOCUMENTS

| | | | |
|---|---|---|---|
| 1,158,985 | 7/1969 | United Kingdom | 61/46.5 |

*Primary Examiner*—Robert C. Watson
*Attorney, Agent, or Firm*—Roylance, Abrams, Berdo & Kaul

[57] ABSTRACT

In offshore platforms and the like of the type comprising a structure, such as a hull, and a plurality of upright legs for supporting the structure on the floor of a body of water, the invention provides an improved rack-and-pinion type jacking apparatus for connecting the structure to the legs in vertically adjustable fashion. For each leg, at least one dual rack bar is employed, the rack bar having two opposed sets of rack teeth each extending along a different one of the two edges of the bar. A jacking unit is mounted on the structure adjacent each rack bar and includes at least one pair of drive pinions with the pinions of the pair each meshed with a different one of the two sets of rack teeth, so that the two pinions are opposed across the rack bar. When the legs each comprise a number of tubular column members, one of the dual rack bars is provided for each of a plurality of the column members of each leg. Alternatively, when the legs are made up of a single tubular member, one or more of the dual rack bars are secured to the single tubular member of each leg.

15 Claims, 19 Drawing Figures

INVENTORS
HERBERT L. WILLKE
JAMES G. ABRAHAM
BY
Arnold, Roylance, Kruger & Durkee
ATTORNEYS INVENTORS
HERBERT L. WILLKE
JAMES G. ABRAHAM
BY
Arnold, Roylance, Kruger & Durkee
ATTORNEYS INVENTORS
HERBERT L. WILLKE
JAMES G. ABRAHAM
BY
Arnold, Roylance, Kruger & Durkee
ATTORNEYS INVENTORS
HERBERT L. WILLKE
JAMES G. ABRAHAM
BY Arnold, Roylance, Kruger & Durkee
ATTORNEYS INVENTORS
HERBERT L. WILLKE
JAMES G. ABRAHAM
BY
Arnold, Roylance, Kruger & Dunkee
ATTORNEYS

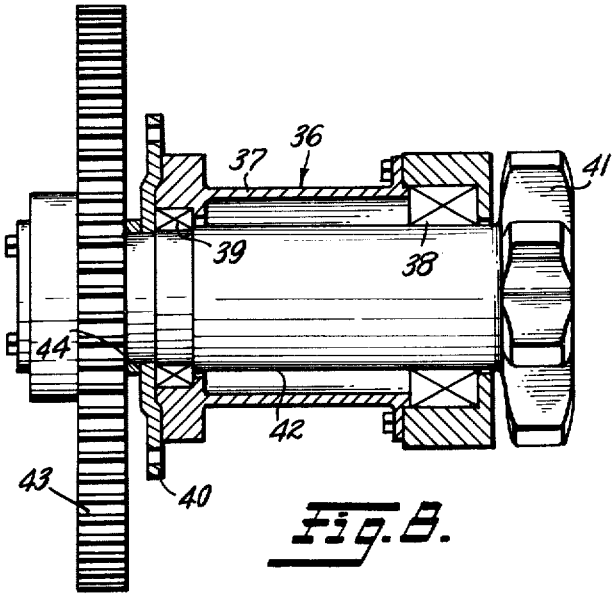
Fig. 8.
Fig. 7.
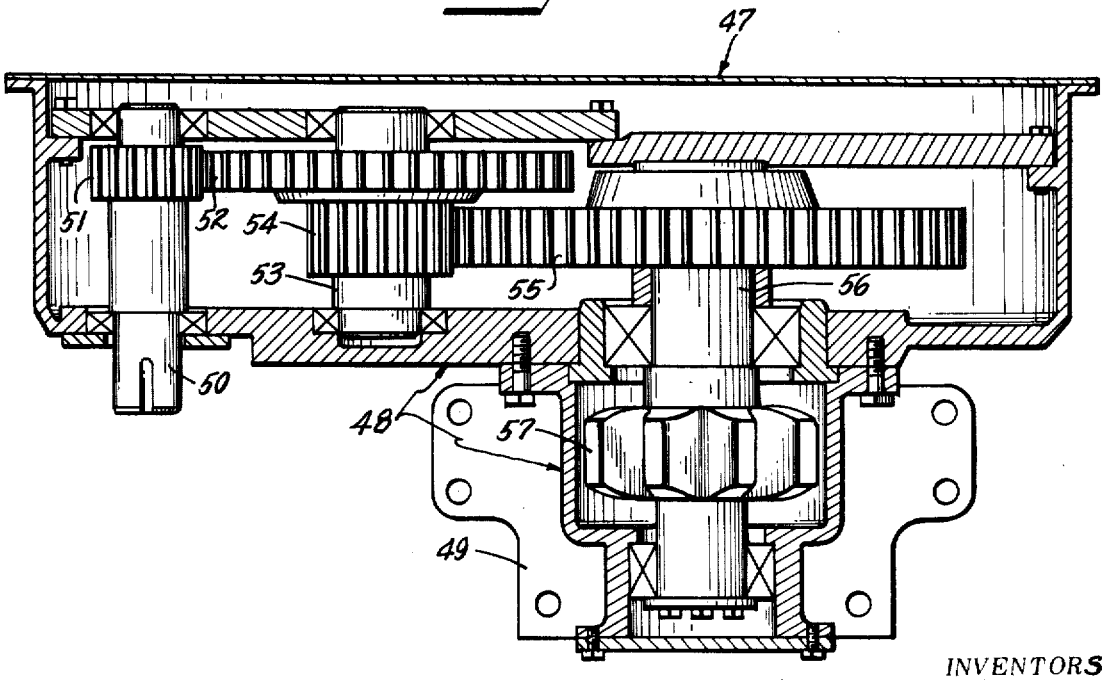
INVENTORS
HERBERT L. WILLKE
JAMES G. ABRAHAM
BY
Arnold, Roylance, Kruger & Durkee
ATTORNEYS INVENTORS
HERBERT L. WILLKE
JAMES G. ABRAHAM
BY
Arnold, Roylance, Kruger & Durkee
ATTORNEYS

LEG SUPPORTED OFFSHORE STRUCTURE WITH JACKING APPARATUS

Matter enclosed in heavy brackets [ ] appears in the original patent but forms no part of this reissue specification; matter printed in italics indicates the additions made by reissue.

This invention relates to offshore platforms and the like comprising structures, such as a buoyant hull, and a plurality of upright legs, and more particularly to an improved rack-and-pinion type jacking system which interconnects the structure and legs in such fashion that, by operation of the jacking system, the vertical position of the structure relative to the legs can be adjusted.

Offshore platform installations equipped with rack-and-pinion type jacking systems have long been known as shown, for example, in U.S. Pat. 2,308,743, issued Jan. 19, 1943, to W. P. Bulkley et al., and 3,183,676, issued May 18, 1965, to R. G. Le Tourneau. Though such structures have been generally successful and have gained commercial acceptance, the great forces applied to the jacking systems, resulting from the very large weight of the structure, have posed problems of such severity that there has been a continuing need for improvement both in the area of the jacking apparatus itself and the manner in which the same is combined with the related portions of the platform structure. One of the most important of such problems arises from the difficulty in keeping the drive pinions meshed with the racks without having recourse to excessively cumbersome and expensive framing and support structures.

It is accordingly a general object of this invention to provide, in a platform or like offshore installation of the type described, an improved rack-and-pinion type jacking apparatus of such nature that proper and continuous engagement of the drive pinions with the rake teeth is assured.

Another object is to devise such apparatus wherein the large forces involved are uniformly and adequately transferred via the racks and pinions of the jacking apparatus.

A further object is to provide, for such offshore installations, jacking units which, though better suited to their purpose, are relatively compact, less expensive, and more easily manufactured and installed than have been the jacking units of the prior art.

Yet another object is to devise improved leg structures, for such offshore installations, in which a dual rack, or a plurality of dual racks, are integrated into the leg structure.

A still further object is to provide a jacking apparatus in which forces tending to distort the platform leg or leg structure are less likely to adversely affect the meshing relationship between the pinions and rack teeth.

Broadly considered, the invention is founded on the concept of using a dual rack, i.e., a rack having two opposed sets of teeth, which is secured rigidly to the leg or to a portion of the leg structure, and providing in combination therewith a jacking unit having two drive pinions which are each meshed with a different one of the two sets of teeth of the rack in such manner that the two pinions are opposed to each other across the rack.

In order that the manner in which the foregoing and other objects are achieved according to the invention can be understood in detail, advantageous embodiments of the invention will be described in detail with reference to the accompanying drawings, which form a part of the original disclosure of this application, and wherein:

FIG. 6 is a side elevational view of the jacking unit of FIG. 4;

FIG. 7 is a sectional view, taken generally on line 7—7, FIG. 5, of one of the gear boxes of the jacking unit of FIGS. 4–6;

Figure 1:
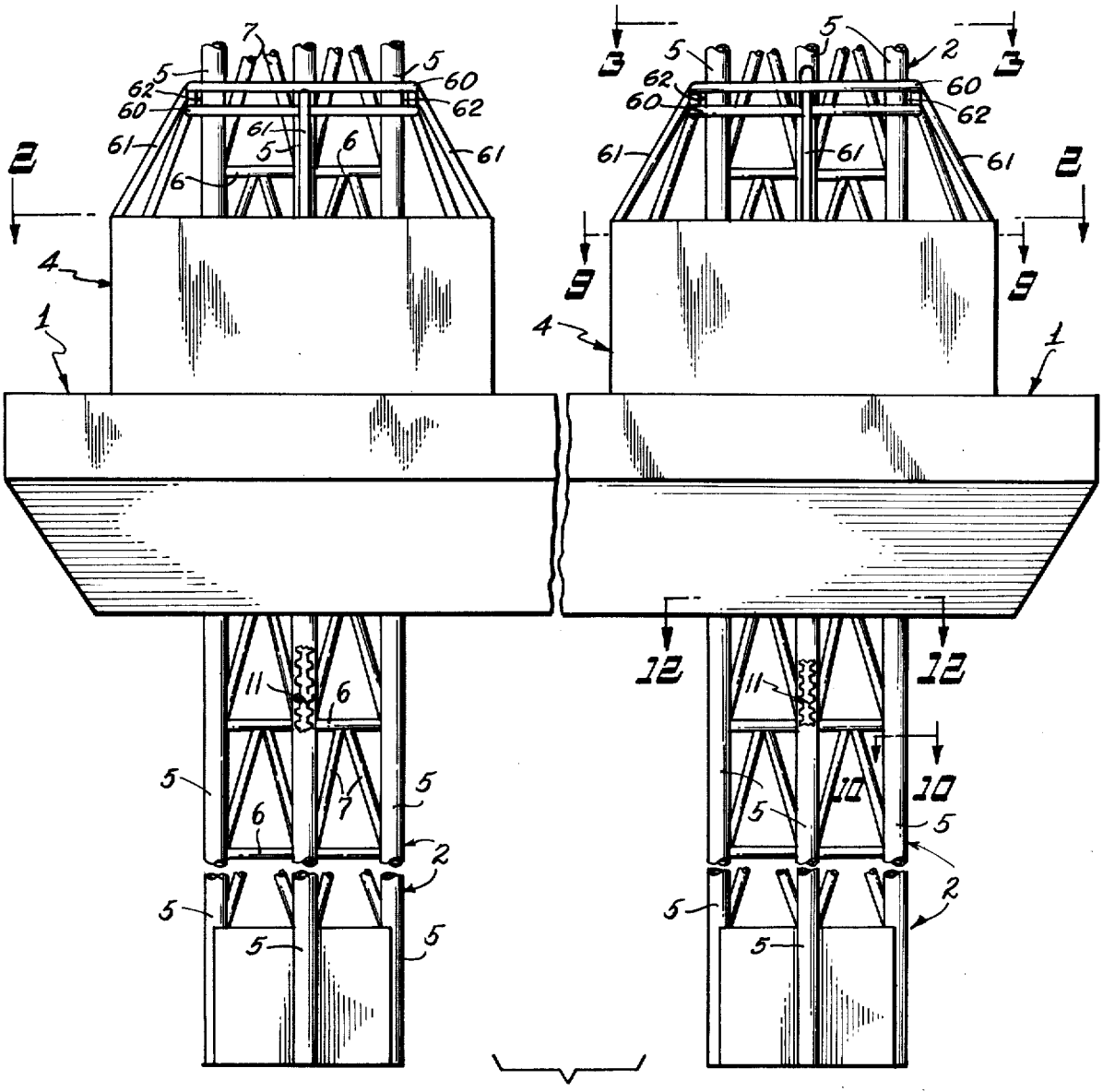
FIG. 1 is a side elevational view of a platform structure incorporating one embodiment of the invention.
Figure 2:
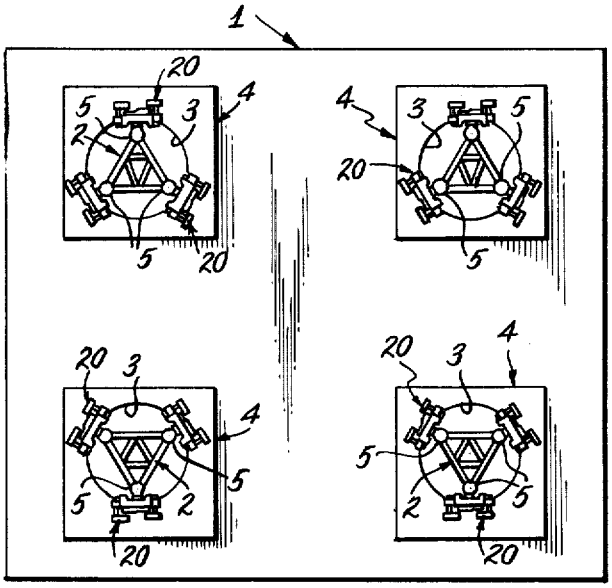
FIG. 2 is a top plan view, taken on line 2—2, FIG. 1, and on smaller scale than FIG. 1.
Figure 3:
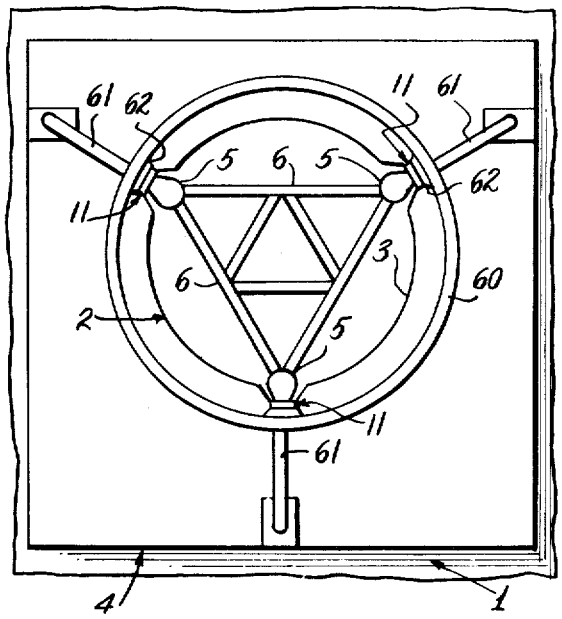
FIG. 3 is a fragmentary top plan view taken on line 3—3, FIG. 1.

Turning now to the drawings in detail, and first to FIGS. 1–3, the invention is illustrated as incorporated in an offshore platform comprising a structure 1 and a plurality of upright leg structures 2. For illustrative purposes, the structure 1 has been shown as a buoyant hull of simple rectangular plan configuration, and is equipped with four of the leg structures, each adjacent a different corner of the hull. To accommodate each leg, the hull is provided with a plurality of openings which extend completely through the hull from bottom to top and are indicated generally at 3, FIG. 2. Above each opening 3, a jack house 4 is mounted on the deck of the hull and projects upwardly for a substantial distance, surrounding the corresponding leg.

In this embodiment, each leg structure 2 comprises three tubular column members 5, the column members being mutually parallel and spaced apart laterally to define a triangle with each column member located at a different one of the apices. Column members 5 are interconnected by horizontal brace members 6, and diagonal, generally longitudinal brace members 7 which extend between each adjacent pair of sets of horizontal brace members.

Figure 10:
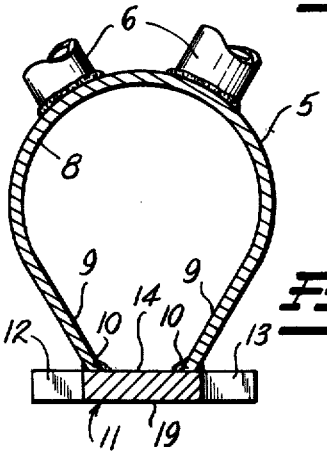
FIG. 10 is a transverse sectional view, taken on line 10—10, FIG. 1, and showing the transverse cross-sectional view of a column member of one of the leg structures of the platform.

The column members 5 are all identical, having the transverse cross-section seen in FIG. 10. Each column member is formed from relatively thick metal stock, generally in the fashion common for the manufacture of heavy wall pipe, and includes a circular wall portion 8 which extends for approximately 270°, and two flat portions 9 which project as tangential extensions of the circular portion 8 and thus converge outwardly to terminate in two parallel straight edges 10.

Each column member 5 is completed by a dual rack member 11 which, in this embodiment, is in the form of a heavy flat metal bar of elongated rectangular transverse cross-section. Two sets of rack teeth 12 and 13 are provided, each extending along a different one of the two small sides of the rectangular rack member. The crest-to-crest width of rack member 11 is only slightly less than the diameter of circular portion 8 of column member 5. The root-to-root width of rack member 11 is significantly greater than the transverse space between the edge portions 10 of column member 5. Accordingly, with the longitudinal center line of rack member 11 extending parallel to the longitudinal axis of column member 5 in a location spaced equally from the two edge portions 10, the two edge portions 10 can both be engaged with one flat face 14 of the body of the rack, as seen in FIG. 10.

Figure 11:
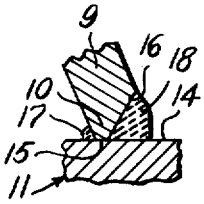
FIG. 11 is a fragmentary transverse sectional view of a portion of the structure shown in FIG. 10.

Each edge portion 10 includes a narrow face 15, FIG. 11, cut at such an angle that, when the rack member 11 and column member 5 are assembled as seen in FIG. 10, the two narrow faces 15 will be in flush engagement with the flat face 14 of the rack member. Each edge portion 10 also includes a wider face 16, FIG. 11, cut at an angle such that, when the column member and rack member are assembled as just described, the wider surface 16 will slant toward the interior of the column member at an angle of approximately 60° with surface 14 of the rack member. The two edge portions 10 of column member 5 are welded to surface 14 of the rack member by providing a small outer sealing bead 17, FIG. 11, and by providing a larger weld bead 18, by emersion welding techniques, between surfaces 16 and 14, FIG. 11. The relatively heavy rack member 11 is thus integrated into the column member of the leg structure, not only closing the space between edge portions 10 but also constituting a load-bearing portion of the column member.

From FIG. 10, it will be seen that the teeth 12 and 13 project in a common plane which extends across the converging planes of portions 9 of the column member in such fashion that each set of rack teeth is spaced outwardly from column member 5 by a distance sufficient to establish free access to the rack teeth for establishing the rack-and-pinion relationship hereinafter described. It is also to be noted that the outer face 19 of the central portion of the rack member is freely exposed for sliding engagement with guide shoes, later described.

Figure 4:
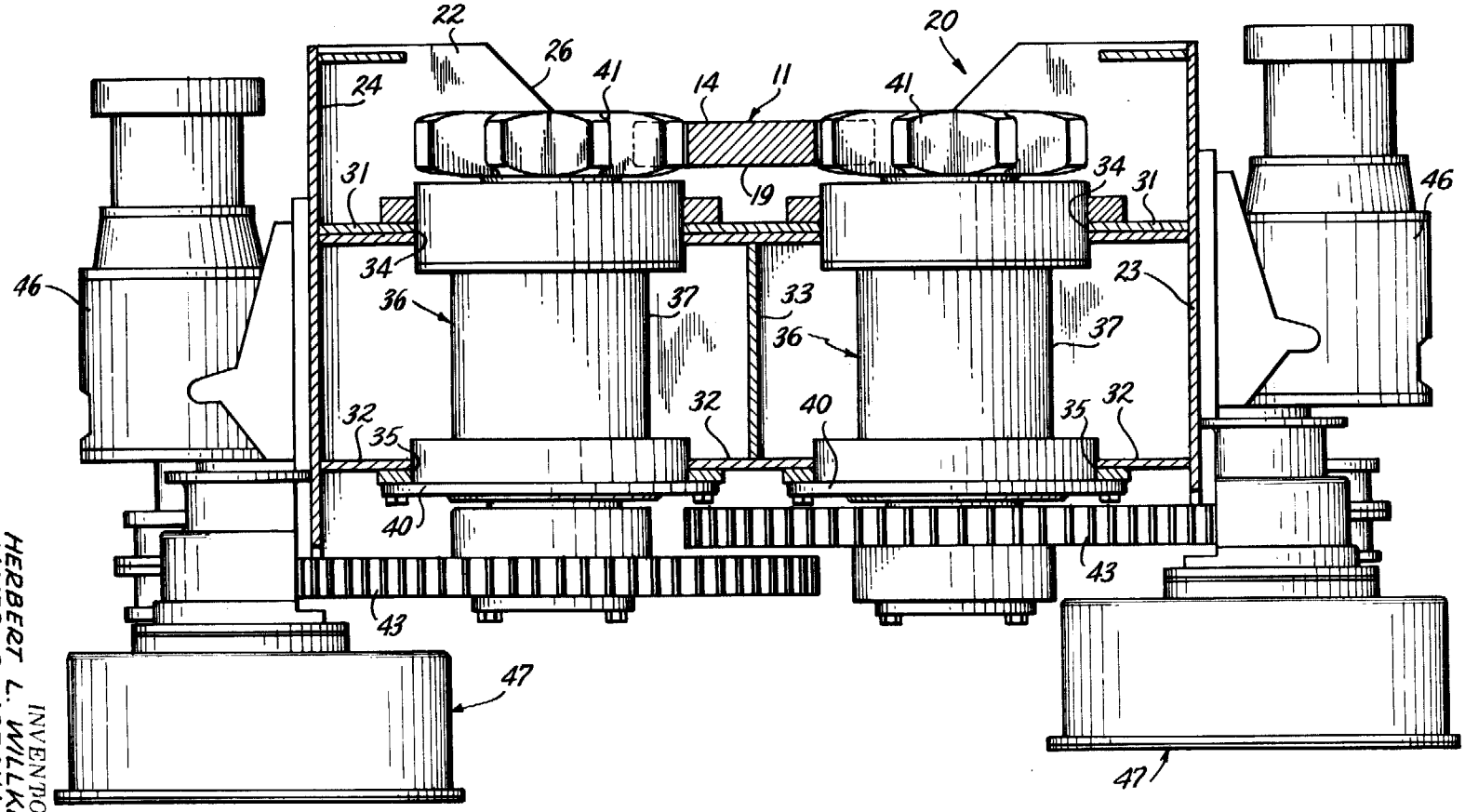
FIG. 4 is a transverse sectional view, on substantially larger scale than FIG. 1, of a jacking unit employed in the platform structure of FIG. 1.
Figure 5:
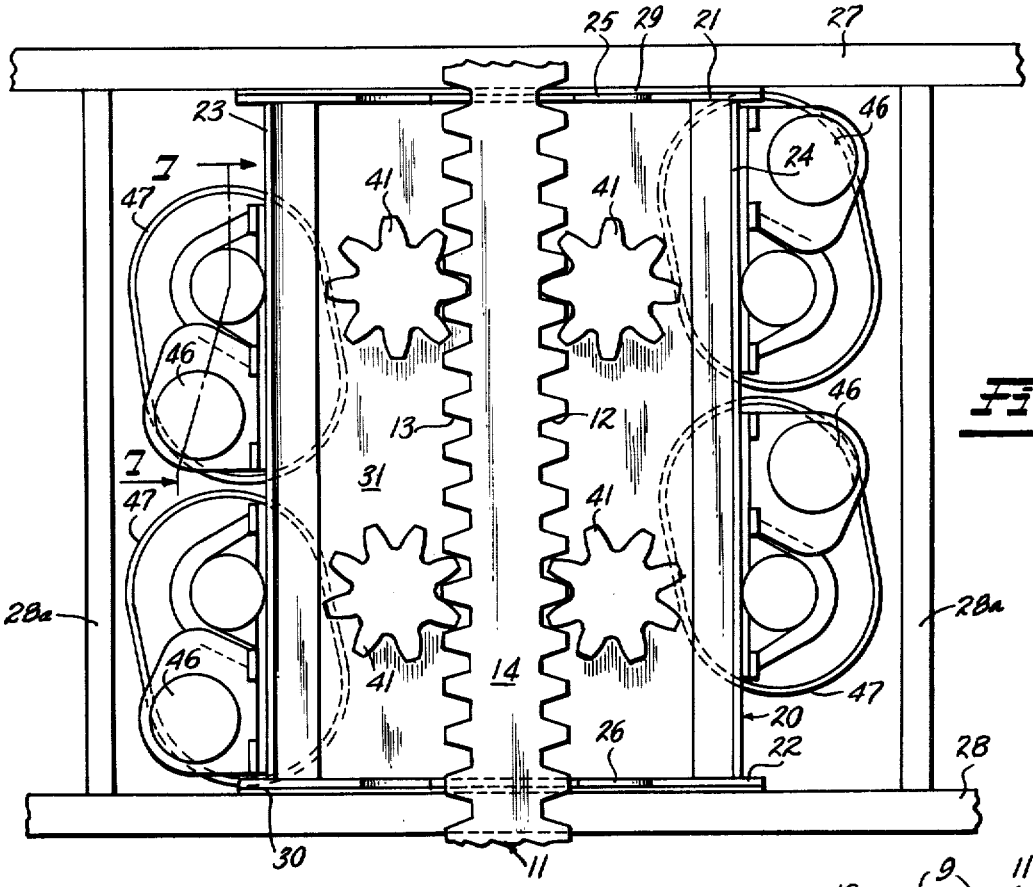
FIG. 5 is a front elevational view of the jacking unit of FIG. 4.

For each dual rack member 11, there is provided a jacking unit indicated generally at 20, FIG. 2, and shown in detail in FIGS. 4–8. In this embodiment, all of the jacking units 20 are identical. Each jacking unit 20 has a frame comprising flat parallel upper and lower end plates 21 and 22, respectively, interconnected by flat parallel upright side plates 23 and 24, respectively, as seen in FIG. 5.

Figure 9:
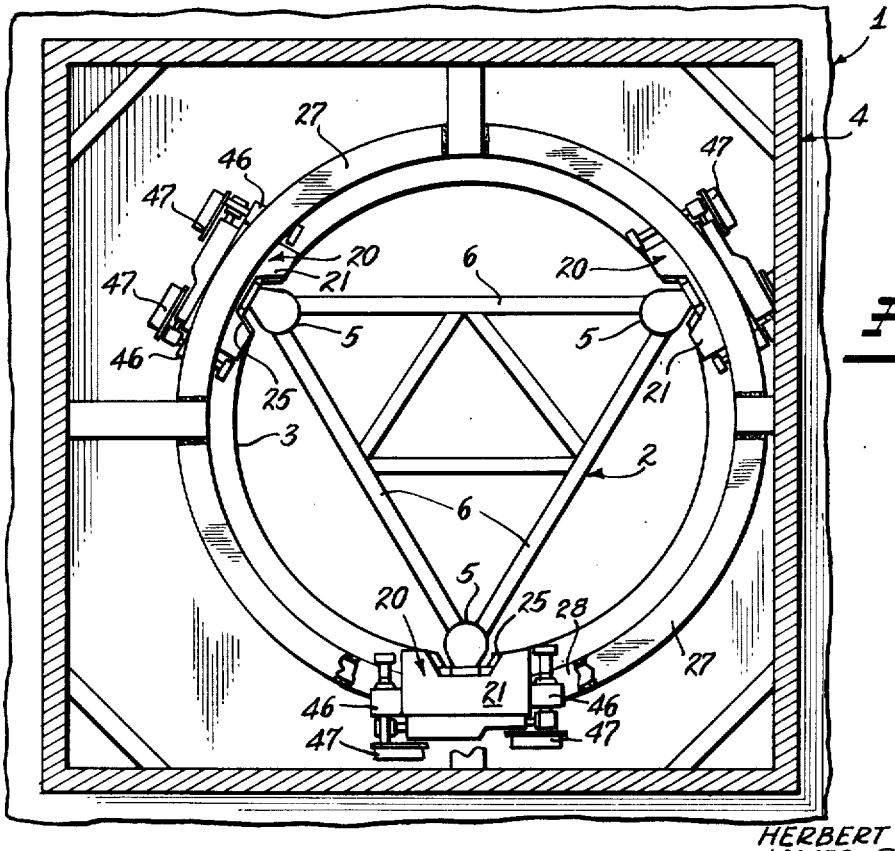
FIG. 9 is a transverse sectional view taken generally on line 9—9, FIG. 1.

At the front of the jacking unit, end plates 21 and 22 are notched, as indicated at 25 and 26, respectively, in FIGS. 4 and 5, so that the jacking unit can be disposed immediately adjacent the corresponding rack member 11 with the rack member extending freely through the two notches. Each jacking unit 20 is fixedly mounted within one of the jack houses 4. In this connection, as will be clear from FIGS. 5 and 9, there are provided in each jack house a pair of vertically spaced, horizontally extending, circular frame members 27 and 28, the vertical spacing between frame members 27 and 28 being such that the jacking units can be disposed therebetween, as seen in FIG. 5, with upper end plate 21 of the jacking unit frame engaged beneath and rigidly secured to frame member 27, lower end plate 22 of the jacing unit being engaged over and rigidly secured to frame member 28. Members 27 and 28 are rigidly interconnected by uprights 28a and are secured to the jack house, and thus to the hull, by any suitable structural frame. Pad members 29 and 30 can be provided, respectively, between end plate 21 and frame member 27 and between end plate 22 and frame member 28, to allow minor vertical adjustments of the jacking unit relative to the frame members 27 and 28.

As best seen in FIG. 4, two spaced parallel partitions 31 and 32 extend completely between end plates 21, 22 and side plates 23, 24, the partitions being welded to plates 21–24. A centrally located upright stiffening plate 33 is provided at the center of the jacking unit and lies in a plane parallel to the two side plates. Stiffening plate 33 has its edges respectively welded to the partitions 31, 32 and the upper and lower end plates. Partition 31 is provided with two pairs of circular openings 34, FIG. 4, and the rear partition 32 is similarly provided with pairs of circular openings 35. Each opening 35 is aligned with a different one of the openings 34, and each aligned pair of openings 34, 35 accommodates a different one of the drive pinion assemblies 36, shown in FIG. 8.

Each pinion assembly 36 includes a tubular bearing housing 37 which supports a front roller bearing 38 and a rear roller bearing 39. The front and rear ends of housing 37 are dimensioned to be snugly embraced by the walls of one of the openings 34 and 35, respectively. The pinion assembly is secured in place by a mounting plate 40 which is bolted to the rear partition 32. Each assembly 36 includes a drive pinion 41 which is integral with a pinion shaft 42, shaft 42 being journalled in bearings 38 and 39 and having a rear end portion which projects beyond the mounting plate 40. A gear 43 is rigidly secured to the rear end portion of shaft 42. An annular spacer 44 disposed between gear 43 and bearing 39 to prevent the combination of pinion 41 and shaft 42 from moving forwardly relative to the bearings. Shaft 42 is provided with a rearwardly facing transverse annular shoulder engaged with the front of bearing 39 to prevent the combination of the pinion and shaft from being shifted rearwardly relative to the bearings.

As will be seen in FIG. 5, each jacking unit includes four of the pinion assemblies 36 and the disposition of openings 34, 35, and thus of the pinion assemblies, is such that the four pinions 41 are arranged in pairs with the pinions of each pair being spaced apart horizontally and with the two pairs of pinions being spaced apart vertically. It will be understood from FIG. 4 that all of the four pinions 41 lie in a common plane. With the jacking unit properly positioned, relative to the corresonding one of leg column members 5, the corresponding rack member 11 extends between the pinions of each of the two pairs of pinions in such fashion that each pinion of the pair is engaged with a different one of the sets of rack teeth. Accordingly, each pair of drive pinions can be considered as being opposed across the rack member.

While the jacking units of this embodiment are illustrated as comprising only two pairs of the drive pinions 41, it will be understood that any suitable number of pairs of opposed drive pinions can be employed.

Each of the drive pinions 41 is driven from a rotary power device, such as an electrical motor 46, FIGS. 4–6, via a speed reducing gear box 47, it being understood that the motors 46 are all identical, as are the gear boxes 47. As seen in FIG. 7, each gear box 47 comprises a housing 48 which is secured to the outer face of the corresponding one of the side plates 23, 24 of the jacking unit by bolts extending through mounting plate 49. The gear box comprises an input shaft 50 carrying a gear 51 meshed with a larger gear 52 supported by shaft 53. Also carried by shaft 53 is a smaller gear 54 meshed with larger gear 55, the latter being secured to a shaft 56. Also secured to shaft 56 is a pinion 57 which projects through an opening in housing 48 in a location behind partition 32, the disposition of the gear box being such that pinion 57 is meshed with the corresponding one of gears 43. In this connection, referring again to FIG. 4, it will be seen that, for each pair of drive pinions 41, the corresponding shafts 42 are of different lengths so that the corresponding ones of gears 43 are in overlapping, staggered relation.

Considering FIGS. 4, 5, and 6, it will be understood that each electric motor 46 is rigidly mounted on the outer side of the appropriate side plate 23, 24, the motor being disposed with its shaft in alignment with the input shaft 50 of the corresponding gear box, and these two shafts being interconnected by a suitable coupling. Accordingly, operation of the electric motor 46 will cause the associated drive pinion 41 to rotate in a direction depending upon the direction in which the motor is driven and at a very slow speed determined by the parameters of the combination of gear box 47 and gear 43.

It will be understood by those skilled in the art that, insofar as the general operation of the apparatus described so far is concerned, the electrical motors 46, or equivalent power devices, can be operated simultaneously, through suitable control means (not shown) first to lower the leg structures 2 from the platform when the platform is brought to location, and then, after the legs are properly engaged with the floor of the body of water, to vertically adjust the positions of the hull on the legs, this general operation of rack-and-pinion pipe platform jacking apparatus being well known in the art. However, the provision of the dual rack members and cooperating opposed pairs of drive pinions provides distinct advantages not heretobefore attained. Particularly, recognizing that the drive pinions of each opposed pair are carried by the same rigid framing structure, it will be seen that forces tending to disengage any of the drive pinions from the corresponding set of rack teeth will be opposed inherently by engagement of the other pinion of the opposed pair with its particular set of rack teeth. Further, using vertically spaced opposed pairs of drive pinions, any tendency for the rack member to tilt, generally in the plane of the drive pinions, will be automatically opposed by at least two of the drive pinions. Thus, considering FIG. 5, tilting movement of the rack member which would tend to disengage the same from the upper left-hand one of the four pinions would be opposed not only by the upper right-hand one of the pinions but also by the lower left-hand one of the pinions, all as viewed in FIG. 5. The overall effect of the combination of the dual rack member with the opposed sets of drive pinions is thus to assure positive engagement between the pinions on the rack teeth throughout the extent of the rack member located in the jacking units at any particular time.

Figure 12:
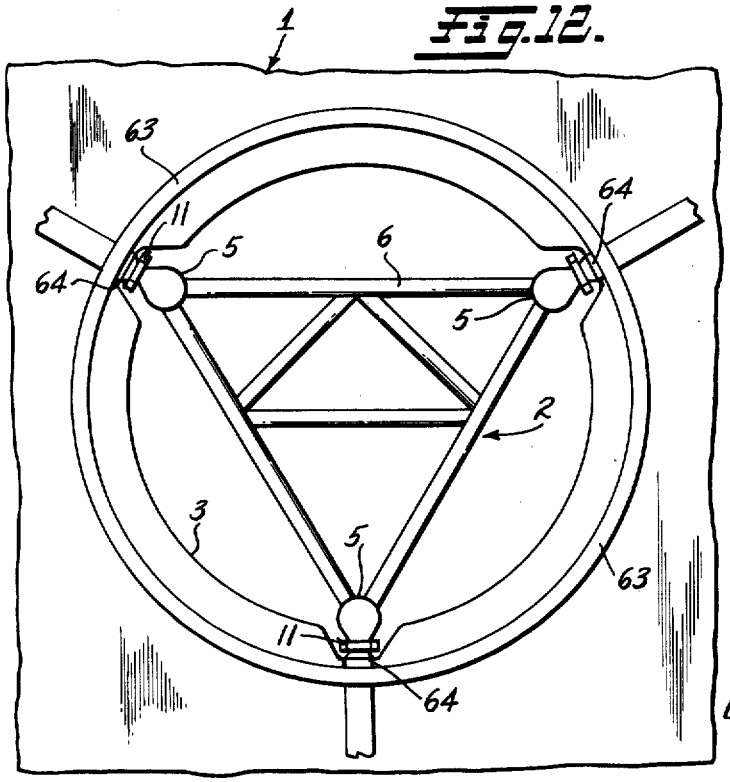
FIG. 12 is a transverse sectional view taken generally on line 12—12, FIG. 1.
Figure 13:
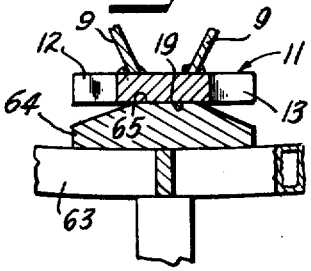
FIG. 13 is an enlarged fragmentary sectional view illustrating one of the guide shoes employed in the structure shown in FIG. 12.
Figure 8:
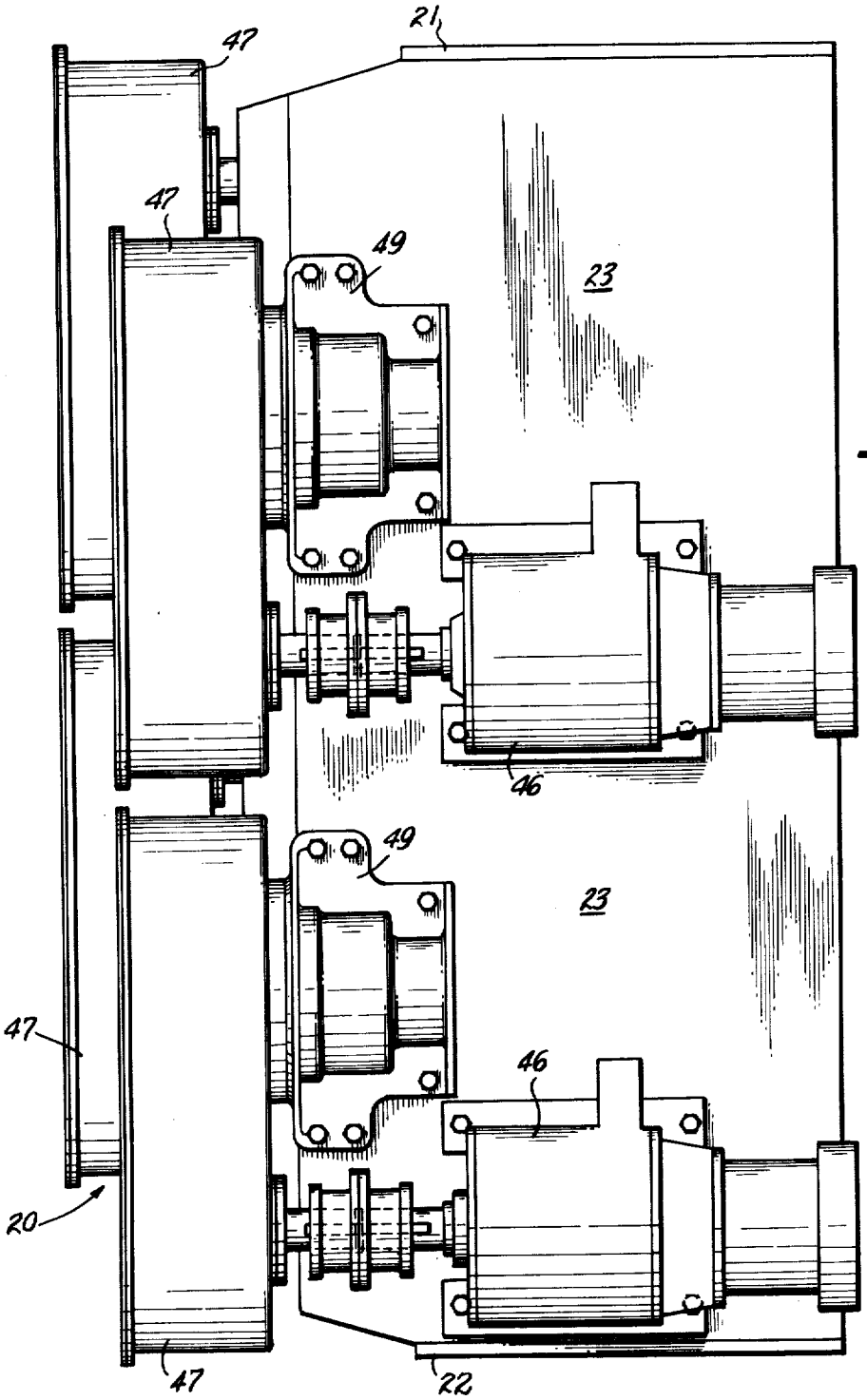
FIG. 8 is a longitudinal sectional view of one of the drive pinion assemblies of the jacking unit of FIGS. 4–6.

To further stabilize the structure, the dual rack members are also employed in such fashion as to coact with the upper and lower guide shoes separated by a substantial vertical distance. As seen in FIGS. 1 and 3, a vertically spaced pair of horizontally extending circular support members 60 is supported above each jack house 4, as by frame members 61. Secured to the inner periphery of support members 60 are three guide shoes 62, the three shoes 62 being equally spaced and so located that each shoe will be aligned with the path of travel of a different one of the dual rack members 11. Similarly, at the bottom of each opening 3, the hull 1 is provided with a rigidly mounted, circularly extending, horizontal support member 63, FIG. 12. Three guide shoes 64 are secured to the inner periphery of support member 63, each guide shoe 64 being aligned vertically below a different one of the guide shoes 62 and, therefore, centered on the path of travel of a different one of the rack members 11. As seen in FIG. 13, the guide shoes 64 are so dimensioned and located that the active face 65 of the guide shoe is held in sliding engagement with the outer face 19 of the corresponding rack member. The relationship between the upper guide shoes 62 and the rack members is the same as that shown in FIG. 13 for the lower guide shoes.

The effect of the upper and lower sets of guide shoes just described is to coact with the jacking units to maintain proper positional relationship between the legs 2 and, therefore, the dual rack members, on the one hand, and the jacking units, on the other hand, and also to counteract bending and tilting movements in the leg structures.

Figure 14:
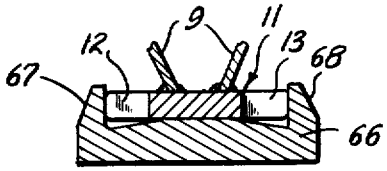
FIG. 14 is a view similar to FIG. 13 but illustrating another embodiment of the guide shoe.

Instead of employing guide shoes with only one flat guide face, as illustrated with respect to guide shoes 62 and 64, the guide shoes can be of generally U-shaped configuration, as indicated at 66 in FIG. 14. Here, the guide shoe 66 includes end portions 67 and 68 which project forwardly from the guide shoe and which are spaced apart by a distance adequate to accommodate the entire rack member 11 with a sliding fit between the crests of the rack teeth and the corresponding one of the end portions 67, 68.

Figure 15:
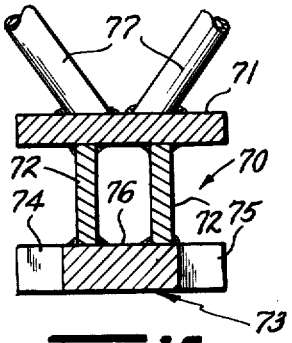
FIG. 15 is a transverse sectional view similar to FIG. 10 but illustrating a combined leg column member and dual rack according to another embodiment of the invention.

As seen in FIG. 15, the leg structures 2 can be made up of column members which are not of pipe-like configuration. In this embodiment, the column member 70 is generally in the form of a double-webbed H-beam comprising a side plate 71, two web plates 72, and the rack member 73. All of members 71–73 are rigidly interconnected throughout their length, as by welding. Rack member 73 is identical with rack member 11, FIG. 10, and includes two opposed sets of teeth 74 and 75, the teeth of each set projecting outwardly beyond a different one of the web plates 72. The appropriate edges of web plates 72 are in flush engagement with the flat face 76 of the uninterrupted central portion of the rack member. The horizontal braces 77 of the leg structure are welded directly to side plate 71.

Figure 16:
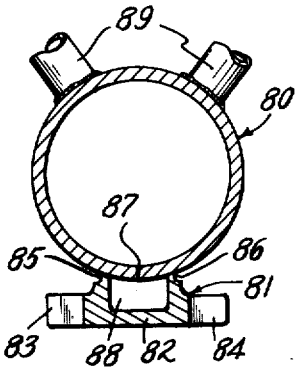
FIG. 16 is a transverse sectional view similar to FIG. 10 but illustrating a combined leg column member and dual rack according to yet another embodiment.

FIG. 16 illustrates another embodiment of the invention, in which the column members 80 of the leg structures are of right cylindrical tubular transverse cross-section, e.g., conventional heavy wall pipe. The dual rack member 81 can be in the form of a cast metal bar comprising a central portion 82 and opposed sets of rack teeth 83, 84. Two longitudinally extending ridges 85, 86 project from the rear face of the rack member terminating in parallel, coplanar edges which are welded to the column member 80, with each ridge being located on a different side of the weld 87 of the tubular column member. The rack member is relieved at 88, between the two ridges 85, 86 to reduce the quantity of metal involved. The horizontal bracing of the leg structure, indicated at 89, is welded directly to tubular member 80.

Figure 17:
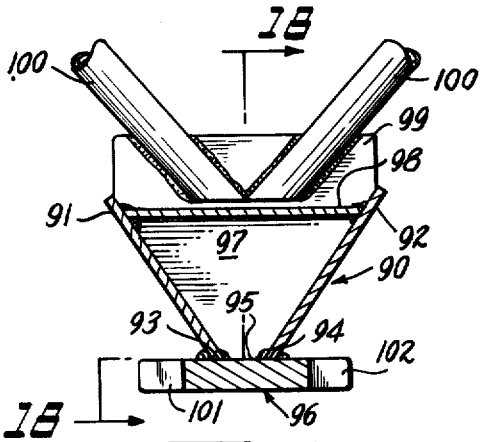
FIG. 17 is a transverse sectional view, similar to FIG. 10 and illustrating a combined leg column member and dual rack according to a still further embodiment.
Figure 18:
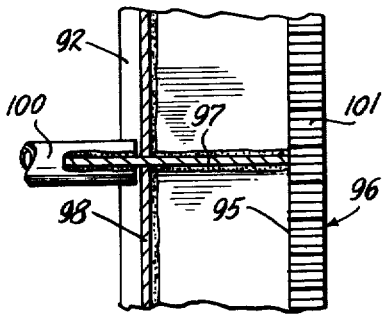
FIG. 18 is a sectional view taken on line 18—18, FIG. 17.

FIGS. 17 and 18 illustrate a column structure, according to another embodiment of the invention, in which the entire structure is fabricated from metal plate without requiring any forming operation to provide a curved structure. Here, the column member 90 comprises two side plates 91, 92, the side plates being flat and of greatly elongated rectangular plan configuration. Each side plate 91, 92 has one of its long edges 93, 94, respectively, welded to the rear face 95 of the uninterrupted central portion of rack member 96. The side plates diverge outwardly away from the rack member, with each side plate slanting away from the rear face 95 of the rack member at an angle conforming to the configuration of the leg structure. A plurality of stiffening partitions 97 are welded between the side plates 91, 92. An additional elongated rectangular, flat plate 98, parallel to the rack member 96, has its edges welded respectively to side plates 91 and 92.

A flat outer flange plate 99 is provided in each of a plurality of locations where provision of the horizontal braces 100 is required. Each plate 99 has one of its edges welded to the outer surface of plate 98 in such fashion that plate 99 lies in a common plane with the corresponding one of the stiffening partitions 97. Plate 99 also has diagonal edge portions welded to the portions of side plates 91 and 92 which project beyond the plane of plate 98. Each horizontal stiffening member 100 is in the form of a heavy wall right cylindrical pipe and iw provided with a diametrically disposed slot at its end to accommodate the flange plate 99, as will be clear from comparison of FIG. 17 and FIG. 18. The horizontal brace members 100 are welded directly to the flange plate 99.

The rack member 96 can be in all respects identical wit rack members 11 and 73 of FIGS. 10 and 15, respectively, and includes opposed sets of rack teeth, 101, 102.

The embodiment of the invention illustrated in FIGS. 17 and 18 has the advantage that, since no forming operations to provide curved configurations are involved, the column member 80 can be fabricated in relatively longer sections than is true of structures such as that seen in FIG. 10.

Figure 19:
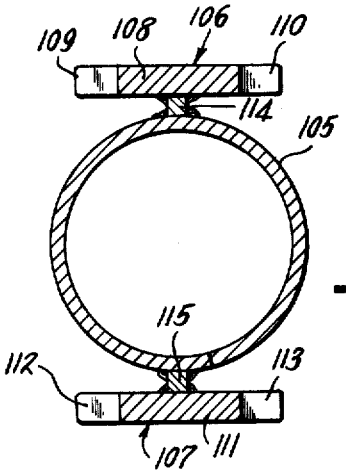
FIG. 19 is a transverse sectional view illustrating a single-member leg structure equipped with two dual racks according to another embodiment of the invention.

In the case of smaller offshore structures, each leg of the structure may be made up of a single structural member, rather than a plurality of column members. FIG. 19 illustrates the manner in which the invention is applied to such an offshore structure. Here, the leg 105 is illustrated as a right cylindrical tubular member, such as a conventional heavy wall pipe. Two rack members 106 and 107 are employed, the rack members being identical and of the same configuration hereinbefore described with reference to FIGS. 10 and 15–18. Thus, rack member 106 has an uninterrupted central portion 108 and two opposed sets of rack teeth 109, 110. Similarly, rack member 107 has an uninterrupted central portion 111 and two opposed sets of rack teeth 112, 113. Rack member 106 is secured throughout its length to leg 105 by an elongated, longitudinally extending metal strip 114 which has its inner edge welded to leg 105 and its outer edge welded to the central portion of portion 108 of rack member 106. In like fashion, rack member 107 is secured throughout its length to leg 105 by a metal strip 115 welded in the same manner as strip 114. Strips 114 and 115 lie in a common plane including the longitudinally central axis of leg 105 and are thus spaced diametrically across the leg. Rack members 106 and 107 are mutually parallel and lie in planes which are at right angles to the common plane of strips 114, 115. It will be understood that, depending on the diameter of leg 105, only one, or more than two, of the rack members can be employed.

It is to be noted that in all of the structures of FIGS. 15–19, the outer faces of the rack members are exposed for operative engagement with guide shoes in the same fashion hereinbefore described with reference to FIGS. 3, 13 and 14.

*As seen in FIGS. 10, 11 and 15–19, the rack means of each embodiment is rigid. Thus, rack member 11, FIGS. 10 and 11, is an integral heavy flat metal bar. In FIG. 15, rack member 73 is a flat bar and, being welded to the two web plates 72, forms one member of the double-webbed H-beam. In FIG. 16, the rack member is in the form of a cast metal bar which is welded at 85, 86 to the wall of heavy wall pipe 80 so that a portion of the wall of the pipe is a part of the rigid structure. Also, in FIGS. 17–19, the rack members are integral metal members in each embodiment.*

*It is also to be noted that the pairs of pinions 41, FIGS. 4 and 5, which are opposed across the dual rack means are rigidly carried by the frame of the jacking unit. Since the shafts 42 which carry pinions 41 are journalled in roller bearings 38 and 39, FIG. 8, and those bearings are supported by housings 37 which are in turn supported by plates 31 and 32 of the frame, the structure is metal-to-metal from the point of engagement of one pinion of the pair with its set of rack teeth through shaft 42, bearings 38 and 39, plates 31 and 32, and then through the bearings and shaft of the opposing pinion, to the remaining set of rack teeth. While the jacking units are mounted on the vessel 1, via members 27 and 28, FIG. 5, and the jack houses 4, FIGS. 1–3, the frame of the jacking units rigidly interconnect the opposed pairs of pinions 41 independently of the means by which the jacking units are mounted on the vessel.*

While particularly advantageous embodiments of the invention have been described for illustrative purposes, it will be understood that various changes and modifications are possible within the scope of the invention. For example, while installations employing multi-column leg structures can embody identical jacking units for all columns of each leg, it is contemplated that in such installations one or more of the jacking units for each leg can have more or fewer pinion pairs than do the other jacking units for that leg. Similarly, though leg structures of triangular transverse cross-section are described with reference to certain embodiments, it will be understood that square and other polygonal configurations can be used.

What is claimed is:

1. In an offshore installation of the type comprising a structure to be supported and a plurality of legs for supporting the structure, the combination of a plurality of elongated *rigid* rack means each having two parallel opposite sides, each of said opposite sides of said rack means having a set of rack teeth extending therealong with the two sets of rack teeth of each rack means facing away from each other, each of said rack means being secured to one of the legs in such fashion that both sets of teeth of the rack means are located outwardly [from] *of* the leg; [and]

a plurality of jacking units [mounted on the structure to be supported and] each cooperating with a different one of said rack means, each of said jacking units comprising rigid frame means, two pinions each mounted on said frame means for rotation about a fixed axis, each of said pinions being operatively meshed with a different one of said two sets of rack teeth of the corresponding one of said rack means, [such meshed relation to said pinions with said teeth of said rack means, and the fact that said axes are fixed rigidly on said frame means, causing any force tending to disengage either of said pinions by movement away from the corresponding set of rack teeth to be opposed by reason of engagement of the other of said pinions with its corresponding set of rack teeth,]

rotary power means, and gearing carried by said frame means and operatively connecting said power means to drive said pinions[.]; *and*

*mounting means mounting said jacking units of the structure to be supported;*

*the meshed relation of said pinions with said teeth of said rack means, the rigidity of said frame means, and the fact that said axes are fixed rigidly on said frame means causing any force tending to disengage either of said pinions by movement away from the corresponding set of said rack teeth to be opposed by reason of engagement of the other of said pinions with its corresponding set of rack teeth, such opposition being effective via said rigid frame means and independent of said mounting means.*

2. The combination defined in claim 1 and wherein the offshore installation is of the type where each of the legs comprises a plurality of rigidly interconnected mutually parallel column members, each of said rack means being rigidly secured to a different one of the column members and each of the legs being equipped with a plurality of said rack means.

3. The combination defined in claim 2, wherein each of the column members is tubular and the wall thereof extends for less than 360°, whereby the column member has two longitudinally extending free edges, each of said rack means being an integral member and being welded to said free edges of the corresponding column member.

4. The combination defined in claim 2, wherein each of the column members is a double webbed H-beam and each of said rack means comprises a member which constitutes one side of the corresponding one of said H-beams.

5. The combination defined in claim 2, wherein each of said rack means comprises a metal member having two integrally formed, longitudinally extending mutually parallel ridges, said ridges being located on different sides of the longitudinal center line of said metal member, the column members of the legs of the offshore structure being tubular and of curvilinear transverse cross-section, and said metal members are each secured to the corresponding column members by having said ridges welded thereto.

6. The combination defined in claim 2, wherein the column members of the legs of the offshore structure are each made up of a plurality of elongated flat plates secured together to form an elongated hollow structure of which the plates constitute the wall and the wall has a longitudinally extending gap defined by edges of two of said plates, said rack means each is an integral dual rack member, the root-to-root width of each of said dual rack members is greater than the width of the gap in the corresponding one of the column members, and each of said rack members is secured to a different one of the column members by welds between said edges and the body of the rack member.

7. The combination defined in claim 6, wherein each of the column members comprises three elongated flat plates so arranged that two of the plates converge away from the other, said two plates having their edges which are distant from said other plate spaced apart to provide said longitudinally extending gap.

8. The combination defined in claim 7, wherein each of the column members is additionally provided with a plurality of flat flange plates welded to the side of said other plate which faces away from the rack member, said flange plates lying in planes which are transverse to the column member, each leg of the offshore structure including horizontal brace members having their ends secured respectively to said flange plates.

[9. The combination defined in claim 1, and wherein the offshore structure is of the type wherein each leg is in the form of a single tubular member, there being a plurality of rack means for each leg, each of said rack means being secured to the respective one of the legs in such fashion that the opposed sets of teeth of the rack means lie in a plane which is parallel to the longitudinal axis of the single tubular member of the leg but spaced laterally from the outer surface of the tubular member.]

10. The combination defined in claim [9] *1*, wherein

*the offshore structure is of the type wherein each leg is in the form of a single tubular member, there being a plurality of rack means of each leg,*

*each of said rack means being secured to the respective one of the legs in such fashion that the opposed sets of teeth of the rack means lie in a plane which is parallel to the longitudinal axis of the single tubular member of the leg but spaced laterally from the outer surface of the tubular member,* an elongated longitudinally extending metal strip [is] *being* interposed between each of said rack means and the tubular member making up the corresponding leg, said strip having one of its longitudinal edges welded to the rack means and the other of its longitudinal edges welded to the tubular member, the width of said strip extending radially with respect to the tubular member.

11. The combination defined in claim 1, wherein each of said rack members has a central body portion having a longitudinally extending face which is directed away from the leg to which the rack member is secured, the combination further comprising a plurality of guide shoes mounted on the structure to be supported, each of said guide shoes slidably engaging said longitudinally extending face of a different one of said rack members.

12. The combination defined in claim 11, wherein each of said guide shoes is of generally U-shaped plan configuration, and each of said rack members is embraced by the corresponding one of said guide shoes.

13. The combination defined in claim 1, wherein each of said jacking units comprises two additional pinions each mounted on said frame means for rotation about a rigidly fixed axis, the axis of rotation of each of said additional pinions being aligned below the axis of rotation of a different one of said first-mentioned pinions.

14. The combination defined in claim 13, wherein said power means includes a separate motor for each of said pinion, said motors being mounted on said frame means.

15. In a jacking unit for supporting a structure such as a hull on a plurality of legs in such fashion that the structure can be adjusted vertically, the combination of a rigid frame adapted to be mounted on the structure to be supported;

a plurality of shafts;

means mounting said shafts on said frame each for rotation about a rigidly fixed axis with said shafts arranged in pairs, the pairs of said shafts being spaced apart vertically and the shafts of each pair being spaced apart horizontally, the respective shafts of each pair lying in the same vertical plane as the corresponding shafts of the next adjacent pair;

a plurality of pinions each carried by a different one of said shafts, said pinions lying in a common vertical plane extending transversely of said shafts;

a plurality of rotary power devices mounted on said frame; and gearing carried by said frame and connecting each of said power devices to drive a different one of said shafts.

16. The combination defined in claim 1, wherein the offshore installation is of the type wherein each of the legs comprises a plurality of rigidly interconnected elongated mutually parallel hollow column members each having a curvilinear transverse cross-section, each of said means is rigidly carried by a different one of said column members and each of the legs is equipped with a plurality of said rack means, and said sets of rack teeth of each of said rack means lie in a common plane parallel to and spaced from the longitudinal axis of the column member which carries the rack means.

* * * * *